United States Patent [19]
Bachmann et al.

[11] Patent Number: 6,116,264
[45] Date of Patent: Sep. 12, 2000

[54] DUAL DAMPER DIVERTER

[75] Inventors: Lothar Bachmann, Auburn; Frank W. Jurgilas, Brunswick, both of Me.

[73] Assignee: Bachmann Industries, Auburn, Me.

[21] Appl. No.: 08/924,145

[22] Filed: Sep. 5, 1997

[51] Int. Cl.[7] .......................... F16K 11/052; F16K 11/10; F27D 17/00; B08B 9/06

[52] U.S. Cl. ................. 137/240; 137/309; 137/625.43; 137/625.44; 137/637; 432/180; 432/181

[58] Field of Search ................... 137/240, 309, 137/311, 625.43, 625.44, 625.47, 637, 637.1; 251/298, 304, 306; 110/210, 211; 432/20, 28, 72, 175, 180, 181; 422/171, 176

[56] References Cited

U.S. PATENT DOCUMENTS

| | | | |
|---|---|---|---|
| 2,703,586 | 3/1955 | Asker | 137/625.43 |
| 2,836,191 | 5/1958 | Wallin et al. | 137/311 |
| 2,910,284 | 10/1959 | Wittler | 137/311 |
| 3,269,414 | 8/1966 | Mayo | 251/306 |
| 3,307,583 | 3/1967 | Harter | 137/625.43 |
| 3,516,440 | 6/1970 | Whitlock et al. | 137/625.44 |
| 3,620,242 | 11/1971 | Pease | 251/306 |
| 3,630,222 | 12/1971 | Tucker | 137/637.1 |
| 4,552,181 | 11/1985 | Hawkins | 137/625.44 |
| 4,739,796 | 4/1988 | Harding et al. | 137/625.43 |
| 4,774,977 | 10/1988 | Cohen | 137/271 |
| 4,872,642 | 10/1989 | Oshima | 251/306 |
| 5,000,422 | 3/1991 | Houston | 251/306 |
| 5,375,622 | 12/1994 | Houston | 137/625.47 |
| 5,529,758 | 6/1996 | Houston | 137/625.47 |
| 5,687,764 | 11/1997 | Tanaka et al. | 137/625.43 |
| 5,692,893 | 12/1997 | Houston | 432/181 |
| 5,888,063 | 3/1999 | Scott et al. | 432/181 |

*Primary Examiner*—George L. Walton
*Attorney, Agent, or Firm*—Pierce Atwood; Chris A. Caseiro

[57] ABSTRACT

A valving system for diverting fluids from one location to another. The valving system includes a valve housing and two or more dampers. The dampers are rotatably coupled to one or more shafts and are designed to move in a synchronized manner such that when opens and closes prior to the other damper or dampers doing so. The valving system of the present invention is particularly useful in the field of regenerative incineration where it is necessary to rapidly change the movement of a hazardous fluid from one regeneration bed to another. However, it may be used in any environment in which switching of the fluid flow over relatively short time periods is desired. The valving system diverts the fluid in a switchable manner that minimizes energy usage without diverting raw fluid directly to an output. A sealing system is located at the ends of the dampers.

9 Claims, 5 Drawing Sheets

DUAL DAMPER DIVERTER

BACKGROUND OF THE INVENTION

1. Field of the Invention

The present invention relates to devices used for the directing the flow of fluids. More particularly, the present invention relates to devices for rapidly switching the direction of flow of fluids, including, but not limited to, those gases associated with the incineration of volatile organic compounds. Still more particularly, the present invention relates to valving used in multi-port fluid transfer system. The present invention is a diverting damper.

2. Description of the Prior Art

One method used to reduce the emission of hazardous fluids, including organic gases created through the production of a wide variety of organic compounds, is regenerative incineration. Regenerative incineration involves the oxidation of hazardous fluids. That is, organic compounds are reduced to relatively inert and relatively harmless gases through combustion. However, many organic compounds require extremely high temperatures—on the order of 600° F. or more—for combustion to take place. A tremendous amount of energy is needed to establish and maintain the high temperatures necessary to ensure substantially complete combustion, as that term is understood in the governing environmental regulations. Further, given the spatial variation in temperature that can easily occur in a combustion chamber, there is no a priori certainty that such regulations will be met simply by raising the apparent temperature of the combustion chamber above the threshold.

In order to create more certainty in the combustion process, and in order to achieve substantially complete combustion within a combustion chamber while also reducing the expenditure of energy, it is a common practice in the field of hazardous fluid removal to add a catalyst to the combustion chamber. The catalyst aids in the reaction process used to create the products of combustion. The catalyst, which may be a plurality of suitable catalysts—or simply an inert material designed to increase dwell time within the chamber—thereby enables substantially complete combustion at a much lower processing temperature.

A generic hazardous-fluids combustion system is illustrated in FIG. 1. As shown, a combustion chamber 10 includes two reaction beds 11 and 12 in communication with one another and having reaction bed ports 13 and 14, respectively. However, it is to be noted that the combustion chamber 10 may have some number of reaction beds other than two. The combustion chamber 10 includes one or more catalysts, usually in each reaction bed. Incoming hazardous fluid enters a multi-port valve 15 from an upstream production unit, by way of a process fluid port 16. The multi-port valve 15 is designed to transfer the hazardous fluid from the fluid port 16 to the combustion chamber 10 that includes reaction beds 11 and 12. After sufficient dwell time in the combustion chamber 10, the combustion products are transferred to an exhaust stack 17 via stack port 18. The valve 15 includes reaction valve ports 19 and 20 for receiving reaction products from the chamber 10, or for delivering non-, or partially-reacted hazardous fluids from beds 11 and 12, respectively. Additionally, the valve 15 may include purge ports 21 and 22 for the introduction and removal of purge air to and from the valve 15.

It is important to note that while the catalyst aids in the oxidation of the hazardous fluid, the enhanced reaction that it produces within the chamber 10 is non-uniform. That is, the reaction occurs over a period of time such that when the hazardous fluid first enters the chamber 10 at a particular temperature—say for example with the fluid moving from valve 15 to reaction port 13—the reaction begins to take place, assuming the temperature at that location is sufficient to initiate the reaction. It accelerates as the heated fluid passes through the chamber 10. As a result, when the fluid moves from bed 11 to bed 12, the temperature within that zone including bed 12 increases to the point that it is greatest at reaction port 14. Correspondingly, the temperature of the fluid at reaction port 13 is lowest within the chamber 10. Through this process, the catalytic capacity of the catalyst is exhausted non-uniformly, with more catalyst available for the reaction near port 13 and less available near port 14. More importantly, the reacted fluid moving from port 14 through valve 15 to stack 17 is at a higher temperature than is the unreacted fluid at port 13. This is a waste of energy directly up the stack 17.

In the field of hazardous fluids combustion, the uneven use of the catalyst in chamber 10, and the waste of energy caused by exhausting higher temperature fluid to stack 17, has been reduced through the design of valve 15. Specifically, the valve 15 is preferably a switchable one that enables the rapid and certain reversal of fluid flow within the system. The switching is designed to direct the hazardous fluid to the higher-temperature end of the combustion chamber and to exhaust the chamber from its lower-temperature end. Preferably, this switching occurs fairly often—generally on the order of every five minutes or less. In this way, no one side of the chamber gets too hot and the loss of energy by way of the exhaust stack is minimized. Also, no one portion of the catalyst is compromised, or otherwise made less effective, sooner than any other portion. As a result of this technique, the system is deemed to be "regenerative." i.e., the heat of the process is used to drive the process.

Prior-art designs of the valve 15 achieve fluid switching with variable levels of success. The most common design includes multiple valving units forming the valve 15. These multiple units include extensive ducting, and they require substantial control means in order to ensure necessary synchronization. Failure to ensure that no hazardous fluid flows directly from port 16 to stack 17 will result in the exhausting of the hazardous fluid directly to the atmosphere—an unacceptable outcome. Unfortunately, the prior-art devices are complex and expensive. For the most part, they include one butterfly valve for each port, and they require extra piping in order to complete the fluid transfer. Thus, for a relatively simple system including four ports, four valves are required. This necessarily results in significant expense in the original fabrication of the valve unit, as well as in its maintenance. Moreover, the additional piping results in the retention of untreated fluid when the valving is actuated and fluid diversion occurs. The retained fluid is then diverted, untreated, directly to the exhaust. Further, the pressure drops associated with the switching of the fluid are undesirable, particularly during the crossing-over of the fluid from one port to another. Coordinated control of the valving is particularly important.

Poppet valves are also used as fluid diversion devices; however, given the fluid volumes and flow rates ordinarily experienced in this field, the pressure drops resulting from the use of such valves are too great to make them practical. Specifically, the poppet is oriented at an angle of approximately 90° to the flow of the fluid. When the poppet valve is actuated, the fluid flow is diverted by that much, and the labyrinthine interiors of those valves result in considerable pressure drops.

One prior-art switching valve has been described in detail in U.S. Pat. No. 5,375,622 issued to Houston. The Houston device is a rotary valve for regenerative incinerators. However, there are several concerns associated with the design of the Houston valve. First, it is apparent that that device must overcome significant gas pressures in order to completely close off one port before opening another. That is caused by the introduction of a plenum as the means for isolating a bypass leakage port. The plenum requires a leak-proof seal between the valve and the valve housing. If the seal is not complete, and that seal must be maintained throughout the entire movement of the valve, it is likely that "dirty" gas will be exhausted directly. A second related problem is that the moving portion of the Houston valve is a single, unitary piece. Given the significant pressures to be overcome at one or more of the ports, it may be that failure to isolate one port may cause a failure to isolate all ports. Finally, given the complexity of the several Houston valve designs presented, it is reasonably likely that mixing of air and the dirty gases will occur such that substantially complete combustion will not occur.

Given the continuing drive to minimize the emission of hazardous fluids, it is necessary to restrict substantially completely the output of such fluids prior to incineration. In that regard, it is to be noted that the removal of hazardous components from exhausted fluids has been substantially raised, increasing from 90% removal to 95% removal to 99% and higher removal. Presently, removal of approximately 99.9% of contaminants from exhaust fluid is virtually a requirement. Therefore, it is essential that any valving mechanism for the control of hazardous-fluid flow be substantially completed sealed and that it permit no direct flow through of contaminated fluid to an exhaust stack.

Therefore, what is needed is a multi-port valve to be used in a regenerative incinerator that is relatively simple and that substantially eliminates the possibility of direct flow through of hazardous fluid to an exhaust stack. What is also needed is such a valve that does not require continuous sealing during any switching of fluid flow direction in order to remain effective. Further, what is needed is such a valve having components operable in a coordinated manner so as to ensure efficient and rapid switching of the flow of hazardous fluids through a combustion chamber with little or no bypass leakage.

SUMMARY OF THE INVENTION

It is an object of the present invention to provide a multi-port valve to be used in a regenerative incinerator, wherein that valve is relatively simple and that substantially eliminates the possibility of contaminated fluid bypass. It is also an object of the present invention to provide such a valve that does not require continuous sealing during component movement in order to remain effective. Further, it is an object of the present invention to provide such a valve having components operable in a coordinated manner so as to ensure efficient and rapid switching of the flow of hazardous fluids through a combustion chamber.

These and other objects of the present invention are achieved through the design of a multi-port valve formed using two or more damper flaps or blades. The damper flaps are designed to be operated in a coordinated fashion so as to divert fluid flow as desired. However, the dampers are not fixed relative to one another, as are prior-art rotary-type valves. Instead, the damper blades are arranged in relation to one another, or at least movable in relation to one another, so that there is an effective delay associated with their sealing of an internal flow-through port. As a result, the movement of one flap is not directly tied to the movement of the other in a way that causes simultaneous sealing of the internal flow-through ports of the multi-port valve.

The damper blades of the present invention are designed to move in a way that ensures that fluid to be moved to the combustion chamber will be diverted there in advance of the opening of the port leading to the exhaust stack. This is preferably done by pivotably affixing each damper to its own rotatable shaft and synchronizing the rotations of the shafts so that first one damper moves from one position to another, trailed by movement of the other damper or dampers. Any number of means for causing this time-delay movement may be used, such as: 1) delaying the actuation of one shaft in comparison to the other or others; 2) offsetting the angle of one damper to another on a single shaft; or 3) by some offset mechanical linkage or sprocketing wherein the movement of one shaft would induce following movement of the other shaft or shafts.

It is to be noted that various kinematic arrangements may be used to effect the actuation of the damper blades. For example, timing belts, eccentric linkages, and the like may be used, where a single actuator is coupled to one shaft, while meshed gears or mechanical linkages may be designed to effect the synchronized offset rotation of the blades. While it is preferable to use separate shafts for each damper blade, it is contemplated that they may be located on the same shaft. It is also possible that sets of coordinated dampers can be stacked on one another in the event that multiple combustion chambers are to be stacked for use with a single exhaust stack.

The multi-port valve of the present invention includes a housing having at least four ports. One port is associated with ducting coupled to the exhaust stack. Another port is associated with ducting used to deliver the fluid to be incinerated. The remaining ports are used for transferring fluids to and from the regenerative incinerator. Since all of the fluid flow diversion occurs within the housing, there is little retention of untreated fluid when the damper is actuated. In addition, the resulting pressure drop is minimized. Within the housing there are preferably two or more support shafts, coupled to the damper blades as noted, running axially substantially the entire length of the housing, and substantially centered within the housing. However, as earlier stated, it may be possible to use a single shaft to operate the damper flaps. At least two damper flaps are rotatably coupled to the shafts, with one flap per shaft for a given combustion chamber. The damper flaps include sealing means at their perimeters to ensure that a tight fit is maintained between the flaps and the interior housing wall frames that fix the resting positions of the flaps.

As previously noted, the prior-art device required that the seal be maintained at all times. The flap-edge sealing means of the present invention is preferably designed so as to induce sealing only when the damper blades are in their resting position in contact with the interior housing wall frames. In that way, the fluid pressure force that must be overcome to achieve movement of the flap is reduced and timely movement is more certain. The shafts are coupled to well-known power sources and/or control means so as to effect movement of the shafts in the manner required for the particular fluid reversal or diversion required.

The design of the present invention is a simplified multi-port valve that ensures fluid diversion in substantially any manner desired. Although the multiport valve of the present invention has been briefly described with respect to four ports, it may be used with any number of ports in any fluid diversion situation contemplated, not simply in the context of hazardous-fluid incineration. Its adaptability will become more apparent upon review of the following detailed description, the accompanying drawings, and the appended claims.

DETAILED DESCRIPTION OF THE PREFERRED EMBODIMENT OF THE INVENTION

Figure 1:
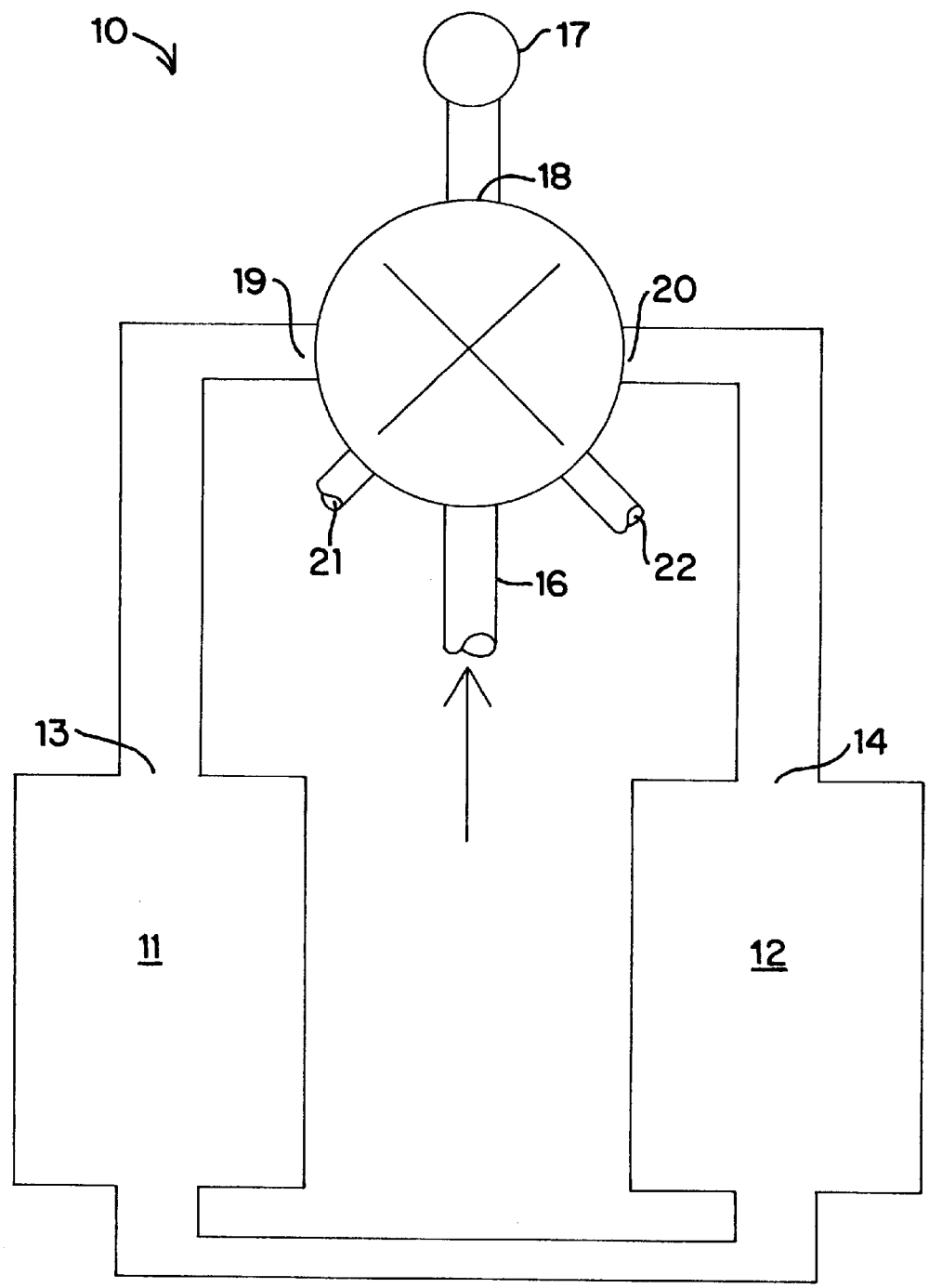
FIG. 1 is a simplified view of a related regenerative incinerator.
Figure 2:
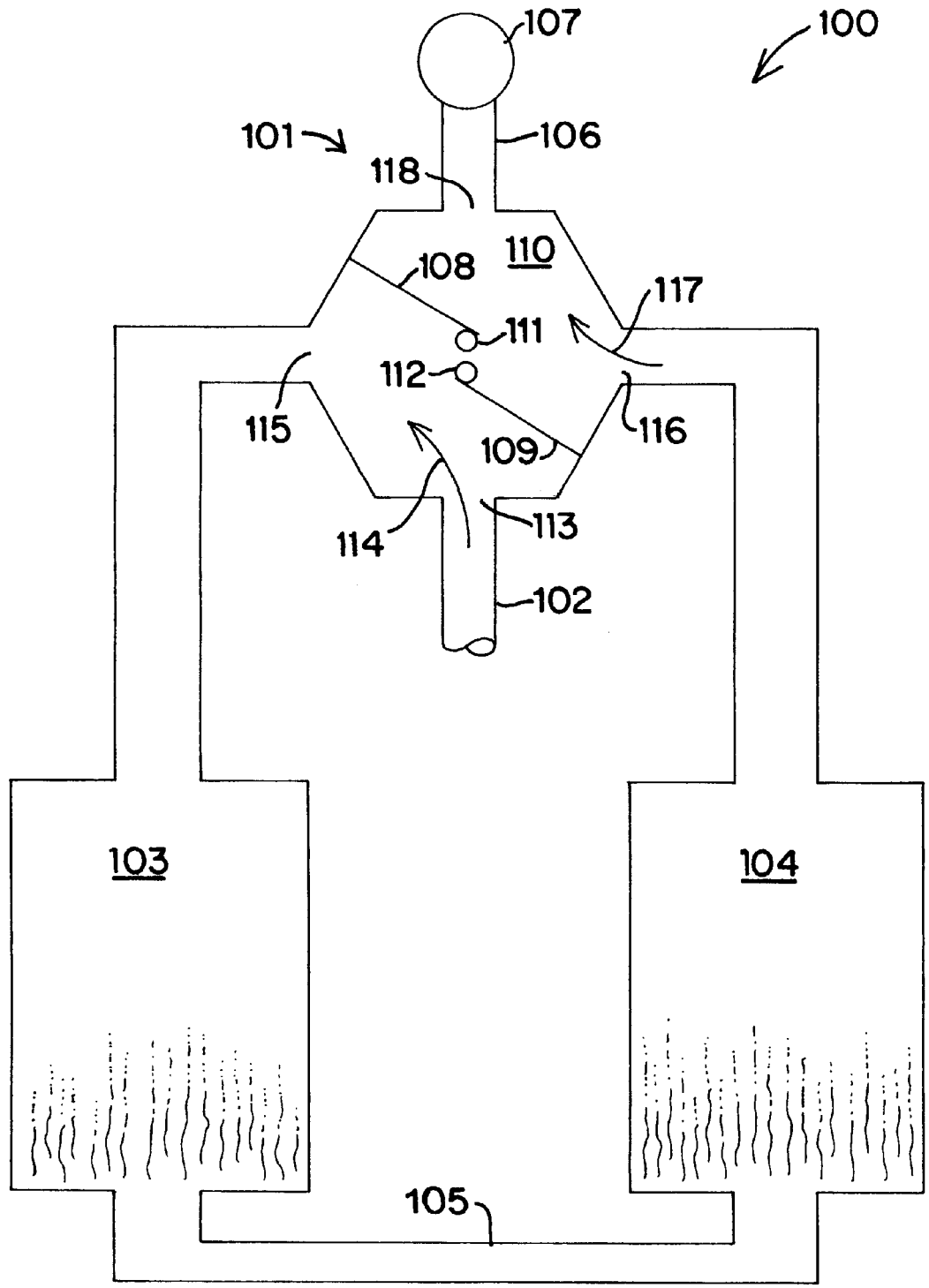
FIG. 2 is a simplified plan view of the multi-port valve system of the present invention shown in conjunction with an inlet, a two-phase incinerator, and an exhaust stack.

A multi-port valve 101 of the present invention is shown in FIG. 2 as part of a larger fluid incineration system 100 including inlet ducting 102, a first regenerative bed 103, a second regenerative bed 104, bed ducting 105, exhaust ducting 106, and exhaust stack 107. It is to be understood that the system shown in FIG. 2 is illustrative and that the present invention is not limited to a valve forming part of a system of that specific arrangement. Moreover, it is also to be noted that the present invention is not limited to use with only two regenerative beds. It is also to be noted that appropriate fans are required to move the hazardous fluid as desired.

The valve 101 includes a first damper blade 108 and a second damper blade 109. The first damper blade 108 is pivotably retained substantially centered within a valve housing 110 by means of a first shaft 111. The second damper blade 109 is retained substantially centered within the housing 110 by means of a second shaft 112. The housing 110, damper blades 108 and 109, and shafts 111 and 112 are preferably fabricated of materials suitable to withstand relatively high temperatures for many hours with minimal distortion. It has been determined that a number of different materials may be used to fabricate the various components of the invention. Specifically, depending upon the operating temperatures and the nature of the fluid, i.e., corrosive or not, the components may be made of any of several materials, including, but not limited to, plain carbon steel, stainless steel, Chromium-Molybdenum steel, high-nickel alloys, such as Inconel 625, and the like.

In operation, a hazardous fluid, such as one or more volatile organic compounds, is transferred by way of inlet ducting 102 into a fluid inlet port 113 of the valve housing 110. In the arrangement of damper blades 108 and 109 shown in FIG. 2, the hazardous fluid is shown at 114 as being diverted to and through a first bed port 115 to first bed 103 for incineration. The fluid passes from the first bed 103 through bed ducting 105 to second bed 104 where further incineration occurs to the point that the hazardous fluid is substantially combusted. The dwell time of the fluid within beds 103 and 104 is dependent upon the substances to be incinerated. It is particularly important that fluids such as paint fumes and plywood-fabrication fumes, as well as other volatile organic compounds, be incinerated substantially completely. In that regard, the valve 101 of the present invention is well suited to ensure substantially complete incineration with minimal retention of fluids within the housing 110.

Continuing with the discussion of the operation of the valve 101, from the second bed 104, the incinerated fluid moves through a second bed port 116 into the valve housing 110 where it is diverted at 117 to exhaust port 118 for transfer through exhaust ducting 106 for output through exhaust stack 107. The key feature of the present invention is that by movement of the damper blades 108 and 109, the fluid flow may be reversed or otherwise changed so that the incoming raw fluid entering the valve 101 at ducting 102 will be diverted first to second bed 104 and then to first bed 103.

Figure 3:
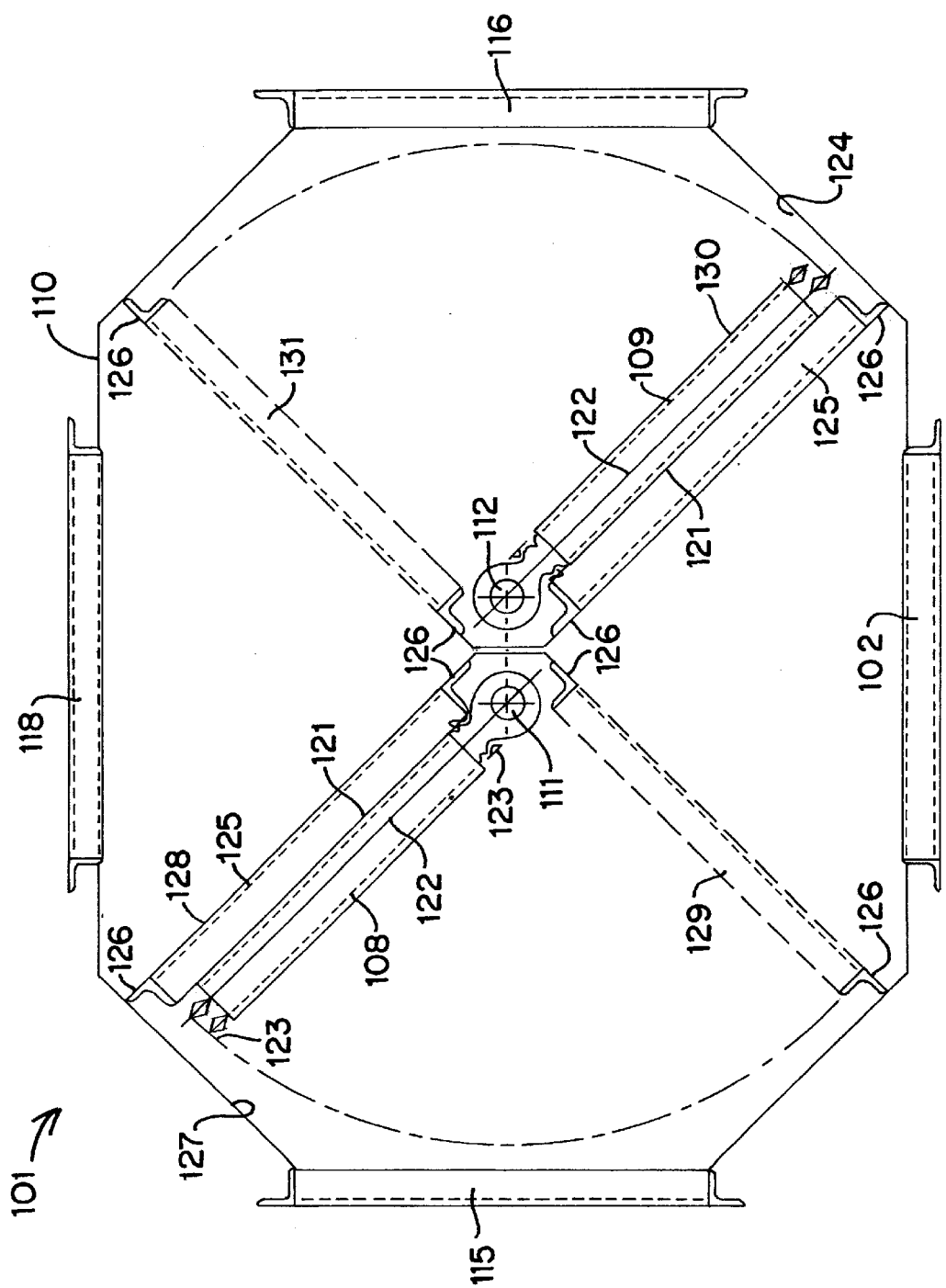
FIG. 3 is a cross-sectional plan view of the multi-port valve of the present invention.
Figure 4:
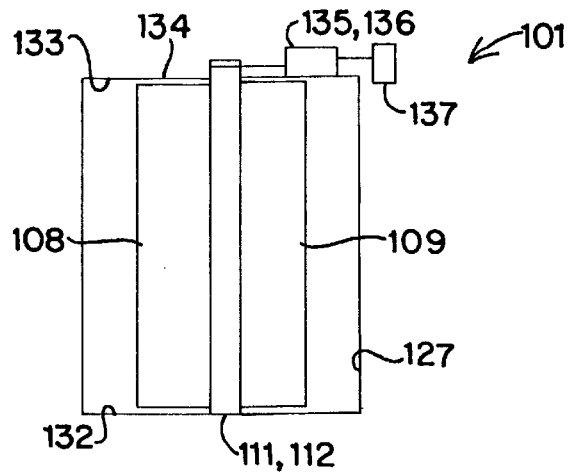
FIG. 4 is a cross-sectional elevation view of the multi-port valve of the present invention.
Figure 5:
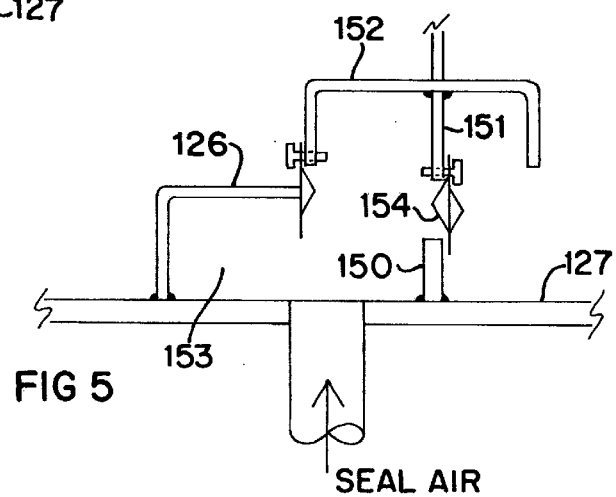
FIG. 5 is a detailed top view of the preferred sealing means of the present invention.

FIGS. 3–5 provide details regarding the design of the damper blades 108 and 109 to achieve the control of fluid flow in a manner that minimizes, if not eliminates, the possibility of direct flow-through of raw fluid to the exhaust stack 107. Specifically, the damper blades 108 and 109 include blade frames 121 and blade membranes 122. In order to minimize potential warping problems, the blade membranes 122 should be reinforced. Attached to the blade frames 121 are flexible seals 123 and springs 124. The flexible seals 123 are preferably metallic leaf seals. The springs 124 are preferably leaf springs designed and used to ensure a tight fit at the interface between the blade frames 121 and an interior housing wall frame 125. Specifically, an angle seat 126 of the housing wall frame 125 is affixed to an interior housing wall 127 and it is at this angle seat 126 that a seal is to be effected between the housing wall frame 125 and the blade frame 121. Alternatively, and dependent upon operating temperatures, rubber, polytetrafluoroethylene (Teflon(TM)), or ceramic sealing materials may be used as sealing means at the noted interface.

Figure 6:
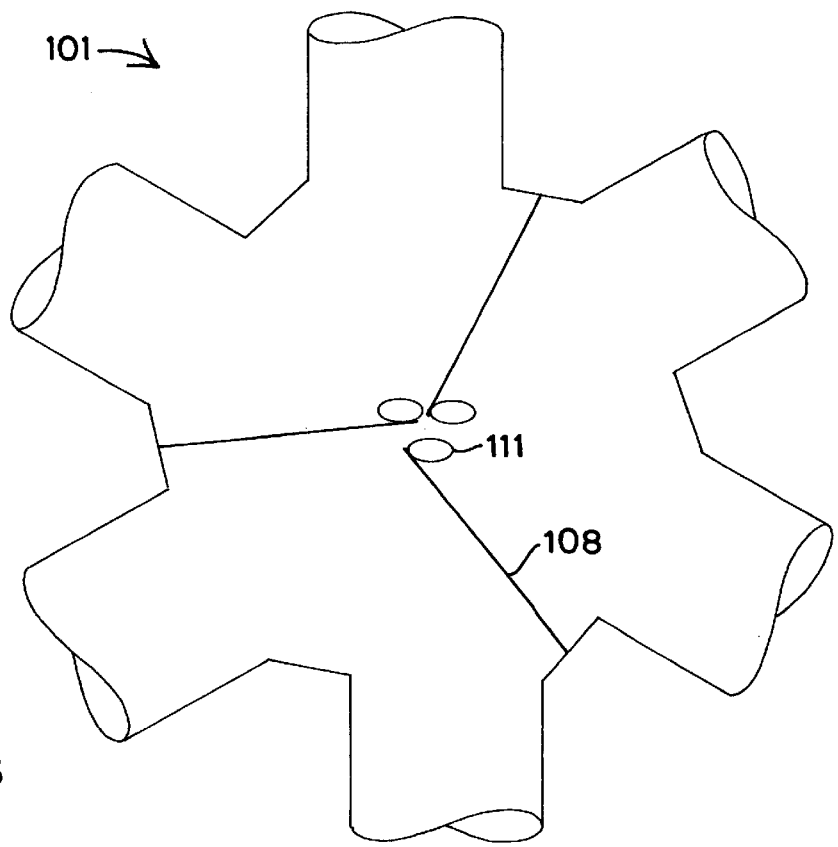
FIG. 6 is a simplified view of an optional six-port valve of the present invention.

The housing wall frame 125 forms an opening through which the fluid to be transferred is moved from one location to another within the valve 101. For a four-port valve as illustrated, there are four housing wall frames fixed to the interior housing walls 127, as shown in FIG. 3, at locations 128, 129, 130, and 131. It is to be understood that in the preferred embodiment of the invention there is one housing wall frame 125 for each port, so that for a six-port valve, for example, there would be six housing wall frames. Therefore, for such a valve, there would have to be three damper blades, each of which may have its own rotatable shaft. Such a design is presented in simplified fashion in FIG. 6.

For each pair of interior housing wall frames there is one damper blade that pivots back and forth so as to contact one or the other of the pairs of interior housing wall frames. For example, damper blade 108 is designed to swing back and forth between the wall frames at locations 128 and 129, while damper blade 109 is designed to swing back and forth between the wall frames at locations 130 and 131.

An important feature of the present invention is the tight sealing of the valve 101 to ensure that there is minimal, and preferably, no leakage of raw (un-incinerated) fluid directly into the exhaust stack 107. The seal that is effected between the damper frame 121 and the wall frame 125 occurs only when the seal 123 comes in contact with the angle seat 126 and is aided by the use of the spring 124. A novel result of the design of the present invention is that the damper blade 108 or 109 is permitted to swing freely from one wall frame to another. Unlike some prior-art devices, then there is no continuous contact between the damper blade and the interior housing wall that could result in damage and wear to the damper blade, and that may also delay the movement of the damper blade from one location to another. This is particularly important when it is critical to ensure switching of the fluid flow from one direction to another in a short period of time. Since continuous contact is not always necessary, the fluid pressures to be overcome during shaft rotation are minimized. This is an important advantage over the prior art.

It is to be understood that the specifics of the way that the damper blades 108 and 109 are made are not limited to the preferred embodiment set out in this description. It is only important to note that they must be designed to account for temperature fluctuations and to ensure tight sealing. For this reason, the valve 101 as described addresses expansion and contraction of the various components. In addition to material selection, this may be achieved by permitting some movement of components. Additionally, the components of the invention may be coupled so as to account for variations in the dimensions of the parts as fabricated. For example, there may be affixed to the wall frames slotted plates that may be moved to required positions during assembly of the valve 101 in order to ensure that there is a tight seal between the wall frames 125 and the blade frames 121.

An alternative component that may be of assistance in ensuring that no leakage or bypassing of fluid occurs between the blade frame 121 and the wall frame 125 is a supplemental sealing means shown in FIG. 5. The supplemental sealing means includes a housing stop 150 affixed to the interior housing wall 127, and a supplemental sealing blade 151 affixed to a blade frame channel 152. When the blade frame 124 is moved into contact with the wall frame 125, the sealing blade 151 contacts the housing stop 150 so as to create an enclosed space 153 into which a purging fluid, such as air, may be injected by well known means. In this way, the possibility of any contaminated fluid exiting through the opening at a housing wall frame is severely restricted. The application of a supplemental sealing spring 154 to the sealing blade 151 aids in ensuring complete contact at that interface.

Figure 7:
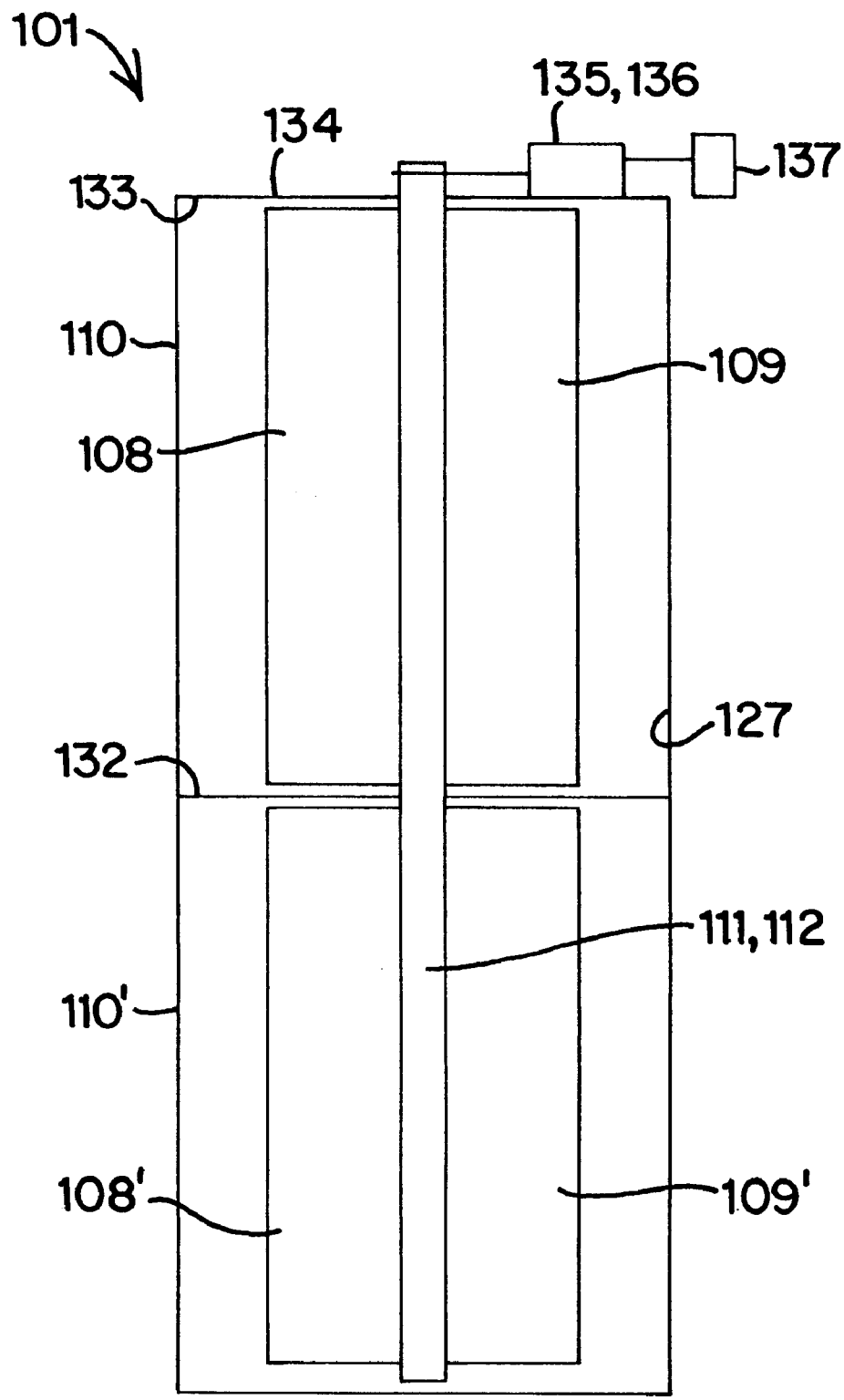
FIG. 7 is a cross-sectional elevation view of a stack of a plurality of housings including the mult-port valve of the present invention.

As illustrated in FIG. 4, shafts 111 and 112 extend from a housing base 132 through a housing ceiling 133 to a housing top 134. Shafts 111 and 112 are each coupled to respective shaft rotating means that are preferably shaft actuators 135 and 136. The actuators are of any type suitable for moving a shaft of the size required to move the damper blades over a variety of actuation rates. It has been determined that either hydraulically- or pneumatically-operated pistons are suitable for this purpose. Alternatively, electric motors may be used. In an alternative design, the actuators 135 and 136 may be positioned at or near the housing base 132 for operation from that location. The actuators 135 and 136 are coupled to a power source 137 or other suitable means that may or may not be controllable, for synchronized movement of the shafts 111 and 112 so as to ensure timely and accurate switching of the damper positions. As illustrated in FIG. 7, a plurality of valve housings 110, 110', may be stacked together, with shafts 111, 112, running therethrough and related dampers 108, 108' and 109, 109', respectively operated in association with actuators 135 and 136 and control means 137.

Although the present invention has been described and illustrated with specific reference to certain detailed designs, it will be apparent to those skilled in this field that alternative embodiments will achieve the same results without deviating from the basic concept of the invention. All such embodiments and their equivalents are deemed to be within the scope of the invention as set out in the following claims.

What is claimed is:

1. A multi-port valving system for the diversion of the flow of a fluid through a plurality of ducts including an inlet duct, an exhaust duct and two or more diversion ducts, the valve system comprising:

a. a housing having a plurality of ports including an inlet port couplable to the inlet duct, an exhaust port couplable to the exhaust duct, and two or more diversion ports corresponding in number to the number of diversion ducts;

b. a first rotatable shaft positioned substantially in said housing;

c. a first damper coupled to said first rotatable shaft such that said first damper pivots when said first shaft rotates;

d. a second rotatable shaft positioned substantially in said housing;

e. a second damper coupled to said second rotatable shaft such that said second damper pivots when said second shaft rotates;

f. a first actuator means coupled to said first rotatable shaft for causing movement of said first rotatable shaft;

g. a second actuator means coupled to said second rotatable shaft for causing movement of said second rotatable shaft; and h. control means for selectively controlling operation of said first actuator means and said second actuator means relative to one another, wherein said first actuator means controlled by said control means causes movement of said first damper that may be coordinated with, but is independent of, movement of said second damper by said second actuator means, also controlled by said control means, in a manner that prevents simultaneous sealing of said ports such that there remains an open fluid pathway between said inlet port and said exhaust port.

2. The valving system as claimed in claim 1 wherein said housing includes interior wall frames corresponding in number to the number of ports, and wherein said first damper and said second damper each include sealing means located on damper frames thereof for effecting a seal between said interior wall frames and said damper frames when said dampers are moved into contact with said interior wall frames.

3. The valving system as claimed in claim 2 wherein said sealing means includes a leaf seal and a spring.

4. The valving system as claimed in claim 3 further comprising supplemental sealing means including a sealing blade affixed to said damper frames and a sealing seat affixed to an interior wall of said housing such that when said damper frame moves into contact with said interior wall frame, said sealing blade contacts said sealing seat so as to form a sealing space for receiving purge air therein.

5. A valve system for the diversion of the flow of fluids being transported from a plurality of fluid generators to one or more exhaust systems, the valve system comprising:

a. a first rotatable shaft;

b. a second rotatable shaft;

c. a first actuator means coupled to said first rotatable shaft for causing movement of said first rotatable shaft;

d. a second actuator means coupled to said second rotatable shaft for causing movement of said second rotatable shaft;

e. a plurality of housings corresponding in number to the number of fluid generators, wherein each of said plurality of housings includes an inlet port, an outlet port couplable to the one or more exhaust systems, and one or more diversion ports, wherein said first shaft and said second shaft pass through each of said plurality of housings, and wherein each of said plurality of housings further includes:

i. a first damper coupled to said first rotatable shaft such that said first damper pivots when said first shaft rotates; and ii. a second damper coupled to said second rotatable shaft such that said second damper pivots when said second shaft rotates;

f. control means for selectively controlling operation of said first actuator means and said second actuator means relative to one another, wherein said first actuator means controlled by said control means causes movement of said first rotatable shaft that may be coordinated with, but is independent of, movement of said second rotatable shaft by said second actuator means, also controlled by said control means, in a manner that prevents simultaneous sealing of said ports such that there remains an open fluid pathway between respective sets of said inlet port and said outlet of each of said plurality of housings.

6. The valve system as claimed in claim 5 wherein each of said plurality of housings includes interior wall frames corresponding in number to the number of said ports, and wherein said first damper and said second damper contained within each of said housings each includes sealing means located on damper frames thereof for effecting a seal between said interior wall frames and said damper frames when said dampers are moved into contact with said interior wall frames.

7. The valve system as claimed in claim 6 wherein said sealing means includes a leaf seal and a leaf spring.

8. The valve system as claimed in claim 7 further comprising supplemental sealing means including a sealing blade affixed to said damper frames and a sealing seat affixed to an interior wall of each of said plurality of housings such that when said damper frame moves into contact with said interior wall frame, said sealing blade contacts said sealing seat so as to form a sealing space for receiving purge air therein.

9. The valve system as claimed in claim 8 wherein said sealing means is a ceramic sealing material.

* * * * *